(12) United States Patent
Ekmekci et al.

(10) Patent No.: US 11,182,539 B2
(45) Date of Patent: Nov. 23, 2021

(54) SYSTEMS AND METHODS FOR EVENT SUMMARIZATION FROM DATA

(71) Applicant: Thomson Reuters Enterprise Centre GmbH, Zug (CH)

(72) Inventors: Berk Ekmekci, Sterling, VA (US); Eleanor Hagerman, Annandale, VA (US); Blake Howald, Northfield, MN (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 0 days.

(21) Appl. No.: 16/848,739

(22) Filed: Apr. 14, 2020

(65) Prior Publication Data

US 2020/0242299 A1 Jul. 30, 2020

Related U.S. Application Data

(63) Continuation-in-part of application No. 16/700,746, filed on Dec. 2, 2019.
(Continued)

(51) Int. Cl.
*G06F 17/00* (2019.01)
*G06F 40/166* (2020.01)
(Continued)

(52) U.S. Cl.
CPC ........ *G06F 40/166* (2020.01); *G06F 16/3347* (2019.01); *G06F 16/345* (2019.01);
(Continued)

(58) Field of Classification Search
CPC ...... G06F 40/166; G06F 40/30; G06F 40/279; G06F 16/93; G06F 16/345; G06F 16/3347; G06N 20/00
See application file for complete search history.

(56) References Cited

U.S. PATENT DOCUMENTS

| 9,336,192 B1 * | 5/2016 | Barba ..................... G06F 40/30 |
| 11,023,554 B1 * | 6/2021 | Miller .................... G06F 9/451 |

(Continued)

OTHER PUBLICATIONS

International Search Report and Written Opinion issued for PCT Application No. PCT/IB2020/054007, dated Jul. 24, 2020, 9 pages.
(Continued)

*Primary Examiner* — Laurie A Ries
(74) *Attorney, Agent, or Firm* — Norton Rose Fulbright US LLP

(57) ABSTRACT

In some aspects, a method includes extracting sentences from data corresponding to documents. Each extracted sentence includes at least one matched pair (a keyword from a first or second keyword set and an entity from an entity set). The method includes ordering the plurality of extracted sentences based on a distance between a respective keyword and a respective entity in each extracted sentence. The method includes identifying a first type and a second type of extracted sentences from the ordered plurality of extracted sentences. Sentences having the first type include keywords of the first keyword set. Sentences having the second type include keywords of the second keyword set. The method includes generating an extracted summary including at least one sentence having the first type and at least one sentence having the second type, intermixed based on a predetermined order rule set. The method includes outputting the extracted summary.

20 Claims, 5 Drawing Sheets

Related U.S. Application Data

(60) Provisional application No. 62/773,502, filed on Nov. 30, 2018, provisional application No. 62/849,182, filed on May 17, 2019.

(51) Int. Cl.
    *G06F 16/93*     (2019.01)
    *G06F 16/34*     (2019.01)
    *G06F 40/30*     (2020.01)
    *G06N 20/00*     (2019.01)
    *G06F 40/279*    (2020.01)
    *G06F 16/33*     (2019.01)

(52) U.S. Cl.
    CPC ............ *G06F 16/93* (2019.01); *G06F 40/279* (2020.01); *G06F 40/30* (2020.01); *G06N 20/00* (2019.01)

(56) References Cited

U.S. PATENT DOCUMENTS

| | | | |
|---|---|---|---|
| 2004/0221235 A1* | 11/2004 | Marchisio | G06F 16/3344 715/261 |
| 2005/0222981 A1* | 10/2005 | Lawrence | G06F 16/951 |
| 2009/0299998 A1* | 12/2009 | Kim | G06F 16/951 |
| 2013/0246046 A1* | 9/2013 | Fan | G06F 40/30 704/9 |
| 2014/0258001 A1* | 9/2014 | Ramaksrihnan ... | G06Q 30/0276 705/14.72 |
| 2015/0120738 A1* | 4/2015 | Srinivasan | G06F 16/285 707/739 |
| 2016/0132572 A1* | 5/2016 | Chang | G06F 16/116 707/723 |
| 2018/0060340 A1 | 3/2018 | Hazra et al. | |
| 2018/0143975 A1* | 5/2018 | Casal | G06F 40/58 |
| 2018/0197128 A1 | 7/2018 | Carstens et al. | |
| 2018/0365326 A1* | 12/2018 | Jiang | G06F 16/282 |
| 2019/0318364 A1* | 10/2019 | Marascu | G06Q 30/018 |
| 2020/0110801 A1* | 4/2020 | Zheng | G06F 40/169 |

OTHER PUBLICATIONS

International Search Report and Written Opinion issued for PCT Application No. PCT/US2019/064036, dated Mar. 2, 2020, 12 pages.

\* cited by examiner

SYSTEMS AND METHODS FOR EVENT SUMMARIZATION FROM DATA

CROSS-REFERENCE TO RELATED APPLICATION

The present application is a continuation-in-part application of U.S. application Ser. No. 16/700,746, filed Dec. 2, 2019, and entitled "SYSTEMS AND METHODS FOR IDENTIFYING AN EVENT IN DATA," which claims priority to U.S. Provisional Application No. 62/773,502, filed Nov. 30, 2018, and entitled, "CEREAL: A CONSOLIDATED SYSTEM FOR ROBUST MULTI-DOCUMENT ENTITY RISK EXTRACTION AND TAXONOMY AUGMENTATION," the disclosures of which are incorporated by reference herein in their entirety. The present application also claims priority to U.S. Provisional Application No. 62/849,182, filed May 17, 2019, and entitled, "EXTRACTIVE RISK SUMMARIZATION," the disclosure of which is incorporated by reference herein in its entirety.

TECHNICAL FIELD

The present subject matter is directed generally to event summarization, and more particularly but without limitation, to generating a summary of a risk event from textual data.

BACKGROUND

Identifying or predicting risk events in textual data associated with individuals, companies, and other entities is a common natural language processing (NLP) task known as risk mining. Monitoring systems rely on risk mining to describe risk events that are generally passed on to an expert for analysis. These mining tasks are generally computationally intensive which require processing large amounts of data available to search. Processing even a portion of such data would require significant processing resources and energy consumption, which may not be supported by many types of electronic devices.

Risk mining technologies are designed to determine relevant textual extractions that capture entity-risk relationships. These risk mining technologies may be applied to large, high volume data sets. When such data sets are processed, a multitude of relevant extractions can be returned. Such voluminous extractions can take substantial time for an analyst to review. Additionally, the extractions may include only a phrase or a single sentence. A phrase or a single sentence may not provide enough information to an analyst to properly determine the relevance of a particular document. To improve the information provided by the text extractions, the text extractions may be used to generate summaries. Two categories of automatic text summarization include abstractive summarization and extractive summarization. Abstractive summarization techniques identify relevant phrases or sentences, then rewrite the identified phrases or sentences to form a summary. For example, abstractive summarization may be performed based on graphs or using neural networks. Extractive summarization techniques identify relevant phrases or sentences (e.g., extracts), rank the extracts to find the most informative extracts, and combine selected extracts into a summary. Abstractive summaries are typically preferred by humans for content or readability, but abstractive summarization techniques are typically more computationally expensive than extractive summarization techniques, and thus require more hardware resources to implement than extractive summarization techniques.

SUMMARY

The present disclosure provides systems, methods, and computer-readable media for data summarization, such as summarization of textual data. For example, the data summarization may include or correspond to event summarization, where an "event," as used herein, corresponds to a combination of a keyword and entity in text of a document. To illustrate, the systems and methods described herein extract sentences from data corresponding to one or more textual documents, order the extracted sentences, identify types of extracted sentences that include matched pairs including keywords from two different keyword sets, and generate a summary that includes sentences having the two types of sentences intermixed based on a predetermined order rule set. For example, data including text from a data source, such as a streaming data source, news data, a database, or a combination thereof, may be received and natural language processing (NLP) performed on the data. After the NLP, a first set of keywords are compared to the data to detect keywords included in the data, and for each keyword, a corresponding entity is identified that is positioned closest to the corresponding keyword to determine a matched pair for the keyword. Additionally, a second set of keywords may be generated based on the first set of keywords and the data, or may be supplied so that, for each keyword, a matched pair for the keyword may be determined. Based on the matched pairs, the systems and methods may extract sentences, such as a single sentences or multiple sentences, from documents that include the matched pairs (e.g., the entities and the keywords).

After extracting the sentences, the systems and methods may order the extracted sentences based on a predicted relevance of the extracted sentences. For example, the predicted relevance may be based on a distance (e.g., a token distance) between a keyword and a corresponding entity in each extracted sentence. In some implementations, the predicted relevance may be further based on frequency of the keywords included in each of the extracted sentences. The systems and methods may also identify a first type of extracted sentences and a second type of extracted sentences from the ordered extracted sentences. Extracted sentences having the first type include one or more keywords that are included in the first keyword set, and extracted sentences having the second type include one or more keywords that are included in the second keyword set. The systems and methods may generate an extracted summary that includes at least one sentence having the first type and at least one sentence having the second type. The at least one sentence having the first type may be intermixed with the at least one sentence having the second type based on a predetermined order rule set. For example, the extracted summary may include sentences having the first type followed by sentences having the second type, in an alternating order indicated by the predetermined order rule set. In other examples, the predetermined order rule set may indicate other orderings of sentence types. The systems and methods may also output the extracted summary. The extracted summary may be stored or provided to an electronic device for review and/or analysis.

In some implementations, the systems and methods may also expand an initial seed taxonomy, such as the first keyword set, using word vector encodings. For example, for at least one document of one or more documents corresponding to the data, a corresponding semantic vector may be generated-e.g., based on a skipgram model that utilizes words and subwords from the document. For at least one keyword, the at least one keyword is compared to each of one or more semantic vectors to determine a corresponding similarity score. A semantic vector having a highest similarity score to the keyword is identified to determine a term of the identified semantic vector as a candidate term. In some implementations, the similarity score of the determined semantic vector having a highest similarity score is compared to a threshold to determine whether or not to discard the candidate term-e.g., the term is discarded if the score is less than or equal to the threshold. The candidate term may be added to the second keyword set to generate the second keyword set (e.g., an expanded keyword set). The initial keyword set and the expanded keyword set may be applied to the extracted sentences to identify sets of extracted sentences as described above.

Thus, the present disclosure provides the ability to extract summaries from text data, such as summaries of events (e.g., risks), that include extracted sentences including keywords from different keyword sets. Because the process of automatically expanding a keyword set (e.g., the second keyword set) from an initial keyword set (e.g., the first keyword set which is user-generated) may broaden or generalize the keywords included in the expanded keyword set, the first keyword set may include more specific keywords, and the second keyword set may include more general keywords. By including both extracted sentences that include more specific keywords and extracted sentences that include more general keywords in the extracted summary, the systems and methods described herein produce high quality output by modeling shifts in specificity that are characteristic of well-formed summaries. For example, extracted sentences that include human-generated keywords (that are more specific) and extracted sentences that include automatically expanded or encoded keywords (that are more general) may be alternated or otherwise ordered in a predetermined manner in the extracted summary based on a predetermined order rule set. By ordering the sentences based on the predetermined order rule set, the systems and methods may generate summaries that are preferable to a human analyst (e.g., based on subject matter, grammatical naturalness, and/or readability) as compared to summaries generated by other systems, without requiring more resource-intensive natural language processing (NLP) used in abstractive summarization systems.

It is noted that while applied here to the risk mining space, in other implementations, the system could be used for any data, entities and taxonomies to support generalized event summarization. To illustrate, the systems and methods may be equally applicable to other areas of summarization, such as document review, auditing, and the like, as illustrative, non-limiting examples.

In one particular aspect, a method for summarizing data includes extracting a plurality of sentences from data corresponding to one or more documents, each including text. Each extracted sentence includes at least one matched pair including a keyword from a first keyword set or a second keyword set and an entity from an entity set. Each extracted sentence includes a single sentence or multiple sentences. The method includes ordering the plurality of extracted sentences based on a distance between a respective keyword and a respective entity in each extracted sentence of the plurality of extracted sentences. The method also includes identifying a first type of extracted sentences from the ordered plurality of extracted sentences. Extracted sentences having the first type include one or more keywords included in the first keyword set. The method includes identifying a second type of extracted sentences from the ordered plurality of extracted sentences. Extracted sentences having the second type include one or more keywords included in the second keyword set. The method also includes generating an extracted summary that includes at least one sentence having the first type and at least one sentence having the second type. The at least one sentence having the first type is intermixed with the at least one sentence having the second type based on a predetermined order rule set. The method further includes outputting the extracted summary.

In another aspect, a system may be provided. The system includes a sentence extractor configured to extract a plurality of sentences from data corresponding to one or more documents each comprising text. Each extracted sentence includes at least one matched pair including a keyword from a first keyword set or a second keyword set and an entity from an entity set. Each extracted sentence includes a single sentence or multiple sentences. The system includes a sentence organizer configured to order the plurality of extracted sentences based on a distance between a respective keyword and a respective entity in each extracted sentence of the plurality of extracted sentences. The system also includes a sentence identifier configured to identify a first type of extracted sentences from the ordered plurality of extracted sentences and to identify a second type of extracted sentences from the ordered plurality of extracted sentences. Extracted sentences having the first type include one or more keywords included in the first keyword set. Extracted sentences having the second type include one or more keywords included in the second keyword set. The system includes a summary extractor configured to extract a summary that includes at least one sentence having the first type and at least one sentence having the second type. The at least one sentence having the first type is intermixed with the at least one sentence having the second type. The system further includes an output generator configured to output the extracted summary.

In yet another aspect, a computer-based tool may be provided. The computer-based tool may include non-transitory computer readable media having stored thereon computer code which, when executed by a processor, causes a computing device to perform operations that include extracting a plurality of sentences from data corresponding to one or more documents each comprising text. Each extracted sentence includes at least one matched pair including a keyword from a first keyword set or a second keyword set and an entity from an entity set. Each extracted sentence includes a single sentence or multiple sentences. The operations include ordering the plurality of extracted sentences based on a distance between a respective keyword and a respective entity in each extracted sentence of the plurality of extracted sentences. The operations also include identifying a first type of extracted sentences from the ordered plurality of extracted sentences. Extracted sentences having the first type include one or more keywords included in the first keyword set. The operations include identifying a second type of extracted sentences from the ordered plurality of extracted sentences. Extracted sentences having the second type include one or more keywords included in the second keyword set. The operations also include generating an extracted summary that includes at least one sentence having the first type and at least one sentence having the second type. The at least one sentence having the first type is intermixed with the at least one sentence having the second type based on a predetermined order rule set. The operations further include outputting the extracted summary.

The foregoing broadly outlines the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
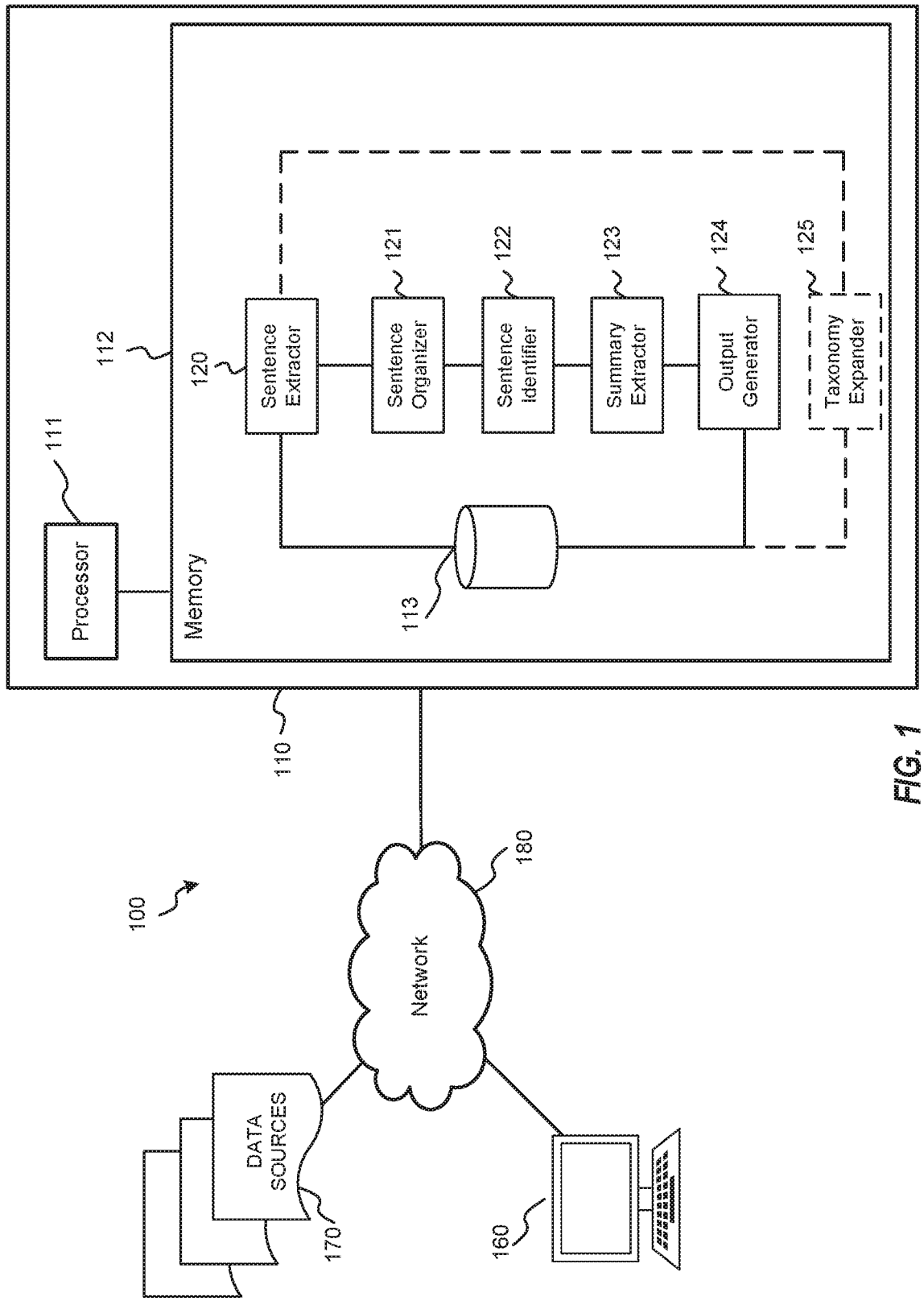
FIG. 1 shows a system configured to perform operations in accordance with aspects of the present disclosure.

FIG. 1 is a block diagram of an exemplary system 100 configured with capabilities and functionality for event summarization. As shown in FIG. 1, system 100 includes server 110, at least one user terminal 160, at least one data source 170, and network 180. These components, and their individual components, may cooperatively operate to provide functionality in accordance with the discussion herein. For example, in operation according to one or more implementations, data (e.g., textual data or documents) may be obtained from data sources 170 and may be provided as input to server 110. The various components of server 110 may cooperatively operate to perform text summarization from the data. For example, the various components of server 110 may cooperative operate to identify matched pairs (e.g., a keyword from a keyword set and an entity from an entity set) in the data and to extract one or more sentences that include the matched pairs. After extracting the sentences, the various components of server 110 may order the extracted sentences based on distances (e.g., token distances) between the keywords and the entities in the extracted sentences, based on frequency of the keywords in the extracted sentences, or both. After ordering the extracted sentences, a first type of extracted sentences is identified. Extracted sentences having the first type include keywords that are included in a first keyword set, which may have a greater specificity than some other keywords. For example, the first keyword set may be human-generated and may include keywords having a high degree of specificity. A second type of extracted sentences is also identified. Extracted sentences having the second type include keywords that are included in a second keyword set, which may have a greater generality than some other keywords. For example, the second keyword set may be an automatically expanded keyword set that is generated by the system based on the first keyword set and the data, such as by using one or more machine learning techniques. After identifying the first and second types, the various components of server 110 may generate a summary, such as multiple extracted sentences, using at least one sentence having the first type and at least one sentence having the second type. The at least one sentence having the first type may be intermixed with the at least one sentence having the second type based on a predetermined order rule set. Such intermixing may be implemented in accordance with rules, such as the predetermined order rule set, configured to provide a more grammatically natural/readable summary. The summary may be stored or provided to an electronic device for review and/or analysis. As such, various aspects of the present disclosure allow text summarization using extracted sentences that include keywords from different keyword sets (e.g., having different types), which may correspond to different levels of specificity or generality in the keywords, as further described herein.

It is noted that the functional blocks, and components thereof, of system 100 of implementations of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

In some aspects, server 110, user terminal 160, and data sources 170 may be communicatively coupled via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between user terminal 160 and server 110.

User terminal 160 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 160 may be configured to provide a graphical user interface (GUI) via which a user may be provided with information related to data and information received from server 110. For example, user terminal 160 may receive results of event summarization from server 110. The results may include one or more summaries, one or more extracted sentences, a document identifier, or a combination thereof, as illustrative, non-limiting examples. A user may review the results and provide an analysis or feedback regarding the results. The analysis or feedback may be provided to server 110 from user terminal 160 as an input.

Data sources 170 may comprise at least one source of textual data. For example, the data source(s) may include a streaming data source, news data, a database, a social media feed, a data room, another data source, the like, or a combination thereof. In a particular implementation, the data from data source 170 may include or correspond to one or more entities. The one or more entities may include an individual, a company, a government, an agency, an organization, the like, or a combination thereof, as illustrative, non-limiting examples.

Server 110 may be configured to receive data from data sources 170, to apply customized natural language processing algorithms and/or other processing to generate one or more summaries based on the received data. In some implementations, the summaries may be event summaries that summarize an event described in the received data and indicated by detection of a keyword and an entity, as further described herein. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. In some implementations, server 110 may be implemented, wholly or in part, on an on-site system, or on a cloud-based system.

As shown in FIG. 1, server 110 includes processor 111, memory 112, database 113, sentence extractor 120, sentence organizer 121, sentence identifier 122, summary extractor 123, output generator 124, and, optionally, taxonomy expander 125. It is noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 112 may store instructions that, when executed by processor 111, cause processor 111 to perform operations in accordance with the present disclosure. In aspects, memory 112 may also be configured to facilitate storage operations. For example, memory 112 may comprise database 113 for storing one or more keywords (e.g., one or more keyword sets), one or more entities (e.g., an entity set), one or more thresholds, one or more matched pairs, one or more semantic vectors, one or more candidate terms, one or more similarity scores, one or more extracted sentences, one or more summaries, one or more predetermined order rule sets, input (e.g., from user terminal 160), other information, etc., which system 100 may use to provide the features discussed herein. Database 113 may be integrated into memory 112, or may be provided as a separate module. In some aspects, database 113 may be a single database, or may be a distributed database implemented over a plurality of database modules. In some embodiments, database 113 may be provided as a module external to server 110. Additionally, or alternatively, server 110 may include an interface configured to enable communication with data source 170, user terminal 160 (e.g., an electronic device), or a combination thereof.

Sentence extractor 120 may be configured to extract a plurality of sentences from data corresponding to one or more documents each comprising text. Each extracted sentence may include at least one matched pair including a keyword from a first keyword set or a second keyword set and an entity from an entity set. Each extracted sentence may include a single sentence or multiple sentences. In some implementations, the keywords of the keyword sets and the entities of the entity set are distinct. In some other implementations, there is at least some overlap between the keywords and the entities. For example, one or more of the keyword sets may include one or more of the entities, the entity set may include one or more of the keywords, or the entity set may be a subset of one of the keyword sets, as non-limiting examples. In some implementations, sentence extractor 120 may be further configured to receive data at a receiver from data sources 170, detect one or more keywords for each keyword of the first keyword set and the second keyword set in the data, determine one or more matched pairs corresponding to the detected keywords, and extract the plurality of sentences that include the one or more matched pairs.

Sentence organizer 121 may be configured to order the plurality of extracted sentences based on a distance between a respective keyword and a respective entity in each extracted sentence of the plurality of extracted sentences. Ordering the plurality of extracted sentences based on distance may correspond to ordering the plurality of extracted sentences based on predicted relevance. For example, a short distance between a respective keyword and a respective entity may indicate a sentence having a relatively high predicted relevance. In some implementations, the distance includes or corresponds to a token distance (e.g., a number of words) between the keyword and the entity. In some implementations, the sentence organizer 121 is configured to order the plurality of extracted sentences based further on frequencies of respective one or more keywords included in each extracted sentence. For example, the frequencies of respective keywords may also be indicative of the predicted relevance of the corresponding sentences (e.g., identification of a keyword with a high frequency may indicate a sentence having a relatively high predicted relevance).

Sentence identifier 122 may be configured to identify a first type of extracted sentences from the ordered plurality of extracted sentences. Extracted sentences having the first type include one or more keywords included in the first keyword set. Sentence identifier 122 may be further configured to identify a second type of extracted sentences from the ordered plurality of extracted sentences. Extracted sentences having the second type include one or more keywords included in the second keyword set. In some implementations, the first keyword set includes a user-generated keyword set, and the second keyword set includes an expanded keyword set based on the first keyword set, as further described herein.

Summary extractor 123 may be configured to extract (e.g., generate) a summary that includes at least one sentence having the first type and at least one sentence having the second type. For example, the summary may include alternating sentences having the first type and sentences having the second type. The sentences are ordered based on a predetermined order rule set. The predetermined order rule set includes one or more rules configured to provide a grammatically natural or readable summary. For example, the predetermined order rule set may include one or more rules that are stored at (or accessible to) server 110 and that indicate an order of sentences for inclusion in summaries based on sentence type (e.g., the first type, the second type, etc.). To further illustrate, in one example, the predetermined order rule set may indicate that sentences having the first type and sentences having the second type are to be intermixed in an alternating order for inclusion in an extracted summary. In other examples, the predetermined order rule set may indicate a different ordering of extracted sentences. Such ordering may be predetermined to enable generation of summaries that are more grammatically natural or readable than other computer-generated summaries.

Output generator 124 may be configured to output the extracted summary. For example, output generator 124 may store the extracted summary, may output the extracted summary to a display device, or may output the extracted summary to another device, such as user terminal 160, as non-limiting examples.

Taxonomy expander 125 may be configured to generate, based on the data and the first keyword set, the second keyword set having a greater number of keywords than the first keyword set. Additional functionality of taxonomy expander 125 is described further herein at least with reference to blocks 240-248 of FIG. 2. It is noted that the functionality of taxonomy expander 125 to expand a keyword set to generate an expanded keyword set may be used prior to, during, or after event identification or summarization.

The database 113 may be coupled to sentence extractor 120, sentence organizer 121, sentence identifier 122, summary extractor 123, output generator 124, taxonomy expander 125, or a combination thereof. In some implementations, database 113 is configured to store the first keyword set, the second keyword set, the entity set, processed data, one or more thresholds, one or more extracted sentences, a plurality of matched pairs, one or more extracted summaries, the predetermined order rule set, or a combination thereof.

Figure 2:
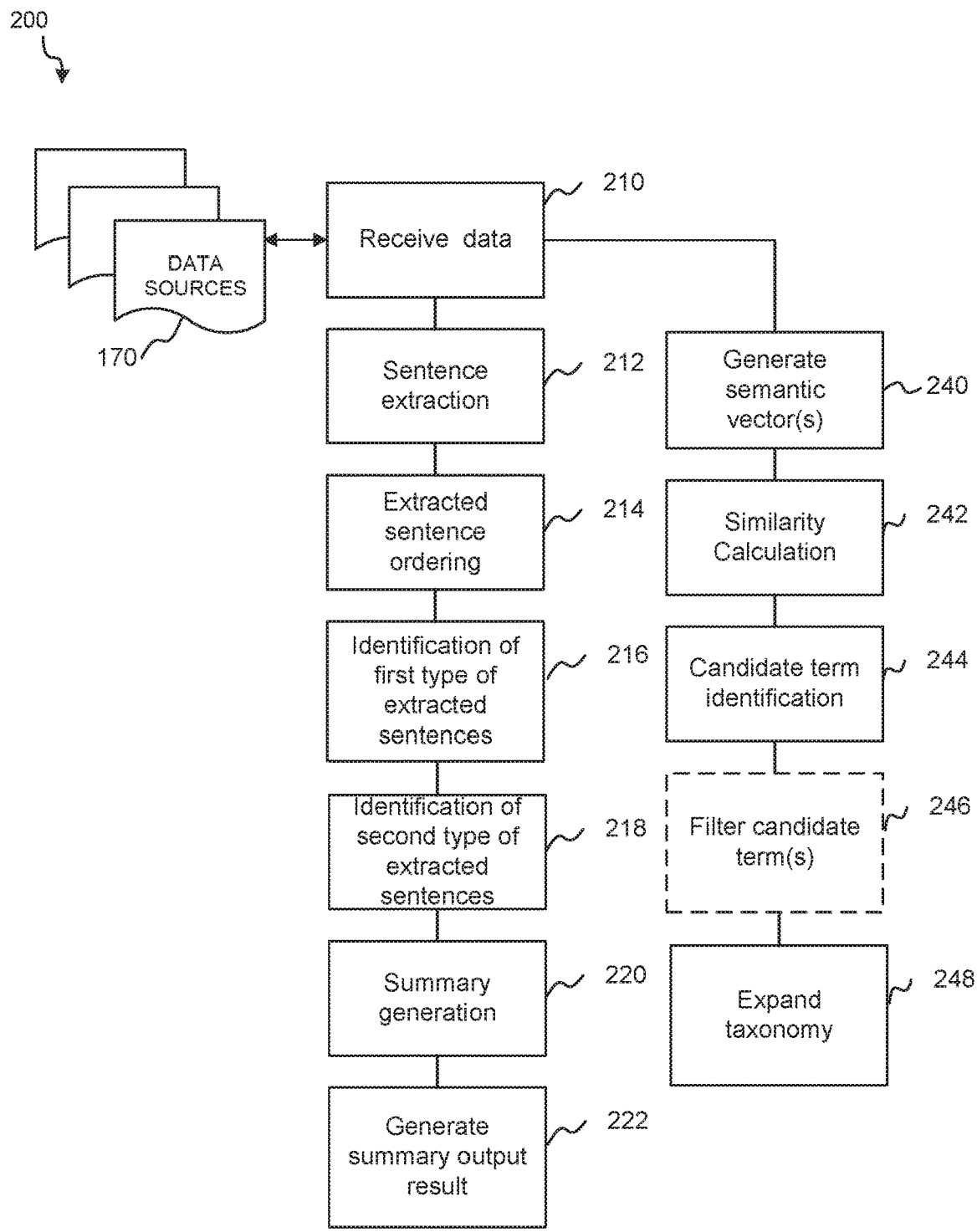
FIG. 2 shows a flow diagram illustrating functionality of the system of FIG. 1 implemented in accordance with aspects of the present disclosure.

The functionality of server 110 will now be discussed with respect to the block flow diagram illustrated in FIG. 2. FIG. 2 shows a flow diagram illustrating functionality of system 100 for summarizing an event in data. Blocks of method 200 illustrated in FIG. 2 may be performed by one or more components of system 100 of FIG. 1. For example, blocks 210 and 212 may be performed by sentence extractor 120, block 214 may be performed by sentence organizer 121, blocks 216 and 218 may be performed by sentence identifier 122, block 220 may be performed by summary extractor 123, block 222 may be performed by output generator 124, and blocks 240-248 may be performed by taxonomy expander 125.

At block 210, data is received (e.g., at a receiver). For example, the data may include one or more documents and may be received from data sources 170. In some implementations, data sources 170 may include a streaming data source, news data, a database, or a combination thereof.

At block 212, sentence extraction is performed. For example, a plurality of sentences may be extracted from the data. In some implementations, each extracted sentence includes at least one matched pair including a keyword from a first keyword set or a second keyword set and an entity from an entity set. Each extracted sentence includes a single sentence or multiple sentences. For example, the keyword and the entity may be included in a single sentence, or the keyword and the entity may be included in different sentences, such as different consecutive sentences. In some implementations, the keywords are distinct from the entities. Alternatively, there may be overlap between the keywords and the entities. For example, one or more of the keyword sets may include one or more of the entities, the entity set may include one or more of the keywords, or the entity set may be a subset of one of the keyword sets, as non-limiting examples. In some other implementations, each extracted sentence includes at least one keyword from the first keyword set or the second keyword set (regardless of whether an entity is included). Extracting sentences that include a keyword (without a corresponding entity) may result in a significantly larger number of extractions, which may widen the scope of the extracted sentences while increasing the processing time and use of processing resources.

In some implementations, the first keyword set includes or corresponds to a user-generated keyword set, and the second keyword set includes or corresponds to an expanded keyword set. For example, the first keyword set may be received via input to the server 110, or may be a previously user-generated keyword set stored in the database 113. The second keyword set may be an automatically expanded keyword set based on the first keyword set, such as a keyword set generated by taxonomy expander 125. For example, taxonomy expander 125 may expand the first keyword set by identifying additional keywords that are similar to the keywords included in the first keyword set using one or more machine learning processes. Because the first keyword set is user-generated, and the second keyword set is automatically expanded, the first keyword set may include keywords having greater specificity, and the second keyword set may include keywords having greater generality.

In some implementations, extracting the plurality of sentences from the data includes multiple operations. For example, extracting the plurality of sentences may include receiving the first keyword set, the second keyword set, and the entity set (e.g., from a database, such as database 113). In some implementations, a selection of a first event category of multiple event categories may be received, and the first keyword set (and the second keyword set) may be retrieved based on the selection of the first event category. In some such implementations, the multiple event categories include cybersecurity, terrorism, legal/non-compliance, or a combination thereof. Extracting the plurality of sentences may also include performing natural language processing (NLP) on the data to generate processed data, the processed data indicating one or more sentences. In some implementations, NLP may include tokenization, lemmatization, and/or sentencization on the data. In a particular implementation, the NLP is performed by a natural language processing pipeline including (in sequence) a tokenizer, a part-of-speech tagger, a dependency parser, and a named entity recognizer. It is noted that a dependency-based sentencizer may be used as compared to a simpler stop-character based approach due to the unpredictable formatting of certain domains of text-e.g., web-mined news and regulatory filings. Extracting the plurality of sentences also includes, after the NLP, performing keyword and entity detection. For example, based on a taxonomy, keywords (from the first keyword set and the second keyword set) may be identified in a list of tokens. To illustrate, the sets of keywords are compared to the processed data to detect keywords in the processed data. Similarly, entities (from the entity set) may be identified in the list of tokens. Next, keyword and entity matching may be performed. For example, for each detected keyword, a corresponding entity is identified that is positioned closest to the corresponding keyword to determine a matched pair for the keyword. The closest entity may be before or after the keyword, and may be in the same sentence or a different sentence. In some implementations, matched pair filtering is performed. For example, a distance (in tokens) between the keyword and the entity of a matched pair is determined, and if the distance is greater than or equal to a threshold, the matched pair is discarded (e.g., filtered out). After matching is performed, and optionally, filtering is performed, sentences that include the matched pairs are extracted. The extracted sentences may be single sentences (if the keyword and entity are in the same sentence) or multiple sentences (if the keyword and entity are in different sentences).

At block 214, extracted sentence ordering is performed. For example, the plurality of extracted sentences may be ordered based on predicted relevance of the extracted sentences. In some implementations, the plurality of extracted sentences are ordered based on a distance (in tokens) between the keyword and the entity in each extracted sentence of the plurality of extracted sentences. For example, matched pairs (e.g., keywords and entities) having a smaller distance between the keyword and the entity may be ordered higher (e.g., prioritized) over matched pairs having a larger distance between the keyword and the entity. The distance may indicate the predicted relevance. Additionally, or alternatively, the plurality of extracted sentences may be ordered based on frequencies of one or more keywords included in each extracted sentence. For example, matched pairs that include keywords that are identified in the data with a higher frequency may be ordered higher (e.g., prioritized) over matched pairs that include keywords that are identified in the data with a lower frequency. The frequency may indicate the predicted relevance.

At block 216, identification of a first type of extracted sentences is performed. For example, a first type of extracted sentences that include keywords included in the first keyword set are identified. At block 218, identification of a second type of extracted sentences is performed. For example, a second type of extracted sentences that include keywords included in the second keyword set are identified. Because the first keyword set is user-generated, and the second keyword set is automatically expanded, the first type of extracted sentences may include more specific information, and the second type of extracted sentences may include more general information.

At block 220, summary generation (e.g., extraction) is performed. For example, an extracted summary may be generated that includes at least one sentence having the first type and at least one sentence having the second type. The at least one sentence having the first type may be intermixed with the at least one sentence having the second type based on a predetermined order rule set. For example, the extracted summary may include multiple extracted sentences, and, in some implementations, the order of the multiple extracted sentences may alternate between sentences having the first type (or the second type), and sentences having the second type (or the first type), or according to another ordering scheme. The ordering of the sentences included in the extracted summary is indicated by the predetermined rule set. Such ordering may be predetermined to enable generation of summaries that are more grammatically natural or readable than other computer-generated summaries. For example, a summary that includes a "general" sentence, followed by one or two "specific" sentences, as a non-limiting example, may be more likely to be grammatically natural and more easily readable to a user, as compared to summaries generated according to a random order of sentences.

In some implementations, the extracted summary may include one or more sets of three extracted sentences (e.g., sentence triples). In some such implementations, each set of three extracted sentences may include a general sentence (e.g., having the second type), followed by a specific sentence (e.g., having the first type), followed by another specific sentence, based on the predetermined order rule set. Alternatively, each set of three extracted sentences may include a general sentence, followed by a specific sentence, followed by another general sentence, based on the predetermined order rule set. In other implementations, the predetermined order rule set may indicate a different ordering, such as an alternating ordering, as a non-limiting example. The predetermined order rule set is configured to enable generation of summaries that are more grammatically natural and readable than other computer-generated summaries.

In some implementations, the extracted summary may be limited to a maximum number of characters or a maximum number of words. For example, generating the extracted summary may include determining whether to include an additional sentence from the first set of extracted sentences or the second set of extracted sentences in the extracted summary based on a determination whether a sum of a length of the extracted summary and a length of the extracted summary is less than or equal to a threshold. To illustrate, sentences may be included in the extracted summary until a total length of the extracted summary exceeds a threshold. At this point, the most recently added sentence is discarded to maintain the total length of the extracted summary below or equal to the threshold. The threshold may be any value, based on considerations of amount of information included in the summaries, storage space used to store the summaries, processing power used to generate the summaries, etc. As one example, the threshold (e.g., the maximum word length) may be 100 words. The threshold (e.g., the maximum word length) may be selected to enable generation of more grammatically natural and readable summaries, and may be indicated by the predetermined order rule set.

At block 222, a summary output result is generated. For example, a summary that includes at least one specific sentence (e.g., at least one sentence having the first type) and at least one general sentence (e.g., at least one sentence having the second type) may be output. The extracted summary may be output to an electronic device for display to a user for review and/or analysis or the extracted summary may be stored in a memory for later processing.

Method 200 also enables expansion of an initial seed taxonomy. To illustrate, at block 240, semantic vectors are generated. For example, for at least one document of the received data, a corresponding semantic vector may be generated. In some implementations, the semantic vector may be generated based on a skipgram model that utilizes words and subwords from the document. At block 242, a similarity calculation is performed. For example, at least one keyword is compared to each of the generated semantic vectors to determine corresponding similarity scores.

At block 244, candidate term identification is performed. For example, a semantic vector having a highest similarity score to the keyword is identified to identify a term of the semantic vector as a candidate term. Optionally, at block 246, candidate terms are filtered. For example, the similarity score of the candidate term is compared to a threshold to determine whether or not to discard the candidate term (e.g., the candidate term is discarded if the score is less than or equal to the threshold). At block 248, the taxonomy is expanded. For example, one or more candidate terms are added to the taxonomy to generate the expanded taxonomy (e.g., an expanded keyword set). The expanded taxonomy may be used in performing sentence extraction and summary generation, as described with reference to the operations of blocks 212-222.

Thus, system 100 (e.g., server 110) and its corresponding operations and functions provides the ability to generate and output text summaries, such as event (e.g., risk) summaries, that more closely conform to summaries generated by humans than other summaries generated by other systems. For example, because the generated summaries include a combination of specific sentences (e.g., extracted sentences including keywords from a user-generated keyword set) and general sentences (e.g., extracted sentences including keywords from an automatically expanded keyword set), the summaries may more closely resemble human-generated summaries, such as by being more grammatically natural. Thus, the predetermined order rule set enables system 100 (e.g., server 110) to generate summaries having improved quality compared to other computer-generated summaries. For example, these summaries may be more preferable to a human analyst than other computer-generated summaries and/or may have improved readability compared to other computer-generated summaries. Additionally, system 100 (e.g., server 110) may generate the improved summaries using fewer computing resources, and less power consumption, than typical abstractive summarization systems. Thus, the techniques of the present disclosure may be implemented on electronic devices with reduced processing capabilities, as compared to typical abstractive summarization systems.

In some implementations, the systems and methods disclosed herein may be used for risk mining. Risk mining seeks to identify the expression of entity-risk relationships in textual data. For example in example sentences (1) below, a CNN-Terrorism relationship is described that is indicated by the reference to CNN in sentence (1)(a) and the keyword representative of the Terrorism risk category, "pipe bomb" in sentence (1)(a) and "bomb threat" in sentence (1)(b).

(1)(a) Later Wednesday, CNN received a pipe bomb at its Time Warner Center headquarters in Manhattan sent to ex-CIA director John Brennan, prompting CNN to evacuate its offices.

(1)(b) It was the second time in two days that the building was evacuated in a bomb threat.

A goal of risk mining systems is to identify the highest value and most relevant text extractions that embody an entity-risk relationship, indexed by an entity and a keyword/phrase—obviating the need for a manual review of numerous sources. However, as systems expand, the number of relevant extracts increases and the challenge to review the information returns. Extractive summarization may address this problem. Summarization performed by the systems and methods described herein include extractive summarization with a focus on creating high quality output that appropriately orders the specificity of information in the extracted summaries.

To illustrate, sentence (1)(*a*) provides details about time ("Later Wednesday"), events ("receiv[ing] a pipe bomb"), locations ("Time Warner Center headquarters in Manhattan"), people ("ex-CIA director John Brennan"), and the resulting event ("evacuat[ing] its [CNN's] offices"). Sentence (1)(*b*) generalizes that this was the second such event in two days. Example sentences (1) may be reordered as example sentences (2) below.

(2)(a) It was the second time in two days that the building was evacuated in a bomb threat.

(2)(b) Later Wednesday, CNN received a pipe bomb at its Time Warner Center headquarters in Manhattan sent to ex-CIA director John Brennan, prompting CNN to evacuate its offices.

As can be seen from example sentences (2), the flow of information is less beneficial, reads less easily, and is representative of what can happen with typical extractive summarization systems. Consequently, as described herein, techniques for improving extractive output include controlling sentence ordering. This is simpler in single documents as preserving the order of the extract in the documents works to encourage a coherent summary. However, for multi-document summaries, this is not as simple and approaches to sentence ordering can become much more complex.

The systems and methods of the present disclosure operate to identify two groups of extracts (e.g., sentences) from a keyword-based risk mining system: one characterized as more specific (from a manually curated/user generated set of keywords) and one characterized as more general (from a semantically encoded set of keywords). By alternating the extract selection between these two groups, which may be ranked by the bidirectional token distance between the entity and the risk keyword, the systems and methods of the present disclosure are able to create extractive summaries that outperform typical summary generation systems.

Risk mining systems typically start with a keyword list that captures, from a subject matter expert's perspective, a risk category of interest and entities that are subject to that risk (e.g., media outlets subject to terrorism, persons subject to fraud, etc.). Systems also expand the initial keyword list and fine tune output through some combination of machine learning and human-in-the-loop review until a desired level of performance is achieved. Domains where risk mining has been applied include financial risks based on filings and stock prices, general risks in news, and supply chain risks, as non-limiting examples. Methods of keyword list expansion include ontology merging, crowdsourcing, and paraphrase detection. A goal of keyword list expansion is to reduce or minimize human involvement while still preserving expert judgment, maintaining, and improving performance through the return of highly relevant extracts.

Techniques for automatic text extraction typically fall into either the abstractive or extractive categories. Abstractive techniques seek to identify relevant phrases and sentences, but the summary is a rewriting of those extracts, such as based on graphs or using neural networks. Extractive techniques attempt to identify relevant text extractions in single and multi-document source material, rank the extracts to find the most informative, and combine the selected extracts into a summarized discourse. Some systems identify and rank relevant extracts based on queries, document word frequencies, probabilities, TF-IDF weighting, topic modeling, graph-based methods, and neural networks. At least some implementations described herein are configured to perform extractions based on entity-keyword matching with subsequent ranking of token distances between entities and risk keywords with summarization being considered multi rather than single-document. Once extracts are selected for inclusion in summaries, techniques may be applied to improve the overall quality of the summary. Improvement on the sentence level includes compression and sentence fusion. Improvement on the discourse (e.g., summary) level includes lexical chains, WordNet-based concepts, and discourse relation and graph representations.

At the word level, specificity can be defined in terms of generics and habituals, as seen below in example sentences (3).

(3)(a) Generic:
  Dogs love to go for walks.
(3)(b) Non-Generic:
  The dog is in the backyard.
(3)(c) Habitual:
  She had trouble walking after she slipped and fell.
(3)(d) Non-Habitual:
  She slipped and fell in Jan. of 2019.

Generics describe either a class of entities, such as dogs in sentence (3)(a), or a member of a class of entities, such as the dog in sentence (3)(b). Habituals describe either specific or regular events, such as trouble walking in sentence (3)(c) or slipped and fell in sentence (3)(d). The ability to detect generics and habituals computationally relies on word-level features such as plurals, quantifiers, verb tenses, categories of noun phrases, and lexical resources such as WordNet.

Beyond the sentence, occurrences of information specificity may be linked to rhetorical relations. For example, "background" relation provides general backdrop information for subsequent clauses, "elaboration" provides more specific unfolding of events, and "specification" provides more specific detail of the previous information. The idea of generics and habituals may be woven into a granularity framework focused on part of and causality shifts across clauses in discourse. Annotated granularities may improve the Naive Bayes and Decision Tree prediction of Segmented Discourse Representation Theory (SDRT). Spatial granularities may be leveraged to improve SDRT rhetorical relation prediction between clauses in narratives and also observe a more global distribution of general to specific (and possibly back to general) as narratives progress globally.

Shifts in specificity are generally associated with texts of higher quality, which can be further broken down into increased readability, higher coherence, and accommodation of the intended audience. It has also been observed that automatic summaries tend to be much more specific than human authored counterparts and, consequently, are judged to be incoherent and of lower comparative quality. In at least some implementations, the systems and methods described herein model specificity by alternating selection of sets of extracts that are more or less specific—a more discourse primitive endeavor-rather than explicitly identifying and explaining habituals, generics, or rhetorical relations.

A system of the present disclosure is a custom NLP processing pipeline capable of the ingesting and analyzing hundreds of thousands of text documents relative to an initial manually-curated (e.g., user defined) seed taxonomy, such as a first keyword set. The system includes at least five components:

1. Document Ingest and Processing: Raw text documents are read and tokenization, lemmatization, and sentencization are performed.
2. Keyword/Entity Detection: Instances of both keywords and entities are identified in the processed text, and each risk keyword occurrence is matched to the nearest entity token.
3. Match Filtering and Sentence Retrieval: Matches within the documents are filtered and categorized by pair distance and/or sentence co-occurrence, and the filtered sentences are retrieved for context.
4. Semantic Encoding and Taxonomy Expansion: A semantic vectorization algorithm is trained on domain-specific text and used to perform automated expansion of the keyword taxonomy.
5. Extractive Summarization Construction: From the total collection of extracts, summaries are formed based on different combination distances, keyword frequencies, and taxonomy.

This design architecture allows for significant customization, high throughput, and modularity for uses in experimental evaluation and deployment in production use-cases. The system may support decentralized or streaming architectures, with each document being processed independently and learning systems (specifically at the semantic encoding/expansion steps) configured for continuous learning or batch model training.

One or more known systems can be used for document ingest and low level NLP, such as spaCy, as a non-limiting example. In some implementations, the system may be configured for high speed parsing, out-of-the-box parallel processing, and Python compatibility. The system may allow for a text generator object to be provided, and may take advantage of multi-core processing to parallelize batching. In such an implementation, each processed document piped in by the system is converted to its lemmatized form with sentence breaks noted so that sentence and multi-sentence identification of keyword/entity distances can be captured.

The shorter the token distance between an entity and a corresponding keyword, the stronger the entity-risk relationship as a function of semantic and pragmatic coherence. For example, example sentence (4) below describes the entity Verizon and its litigation risk associated with lawsuit settlement (keywords being settle and lawsuit).

(4) In 2011, Verizon agreed to pay $20 million to settle a class-action lawsuit by the federal Equal Employment Opportunity Commission alleging that the company violated the Americans with Disabilities Act by denying reasonable accommodations for hundreds of employees with disabilities.

Returning the entire sentence yields additional information-the lawsuit is class-action and the allegation in the complaint is that Verizon "denied reasonable accommodations for hundreds of employees with disabilities." The detection process performed by the system begins by testing for matches of each keyword with each entity, for every possible keyword-entity pairing in the document. Algorithm 1 provides the simplified pseudocode for this process.

---
Algorithm 1 Entity-Keyword Pairing
---
Require: taxonomy and entities lists
   for keyword in taxonomy do
      for entity in entities do
         keywordLocs =-findLocs(keyword)
         entityLocs = findLocs(entity)
         for kLoc in keywordLocs do
            bestHit = findClosestPair(kLoc, entityLocs)
            results.append((keyword, entity, bestHit))
         end for
      end for
   end for
   return findClosestPair is two token indices
---

In some implementations, for every instance of every keyword, the nearest instance of every available entity is paired-regardless of whether it precedes or proceeds the keyword. Furthermore, an entity may be found to have multiple risk terms associated with it, but each instance of a risk term will only apply itself to the closest entity. This helps prevent overreaching conclusions of risk while allowing the system to remain flexible. For example, example sentence (5) extends the extract of example sentence (4) to the prior contiguous sentence which contains settlement. This extension provides greater context for Verizon's lawsuit. Example sentence (5) is actually background for a larger proposition being made in the document that Verizon is in violation of settlement terms from a previous lawsuit.

(5) McDonald says this treatment violated the terms of a settlement the company reached a few years earlier regarding its treatment of employees with disabilities. In 2011, Verizon agreed to pay $20 million to settle a class-action lawsuit by the federal Equal Employment Opportunity Commission . . . .

The "shallow" parsing approach (e.g., the token distance approach) of the system promotes efficiency and is preferable to more complex NLP, e.g., chunking or co-reference resolution. Nonetheless, this flexibility comes at a computational cost: a total of $(m \cdot a) \times (n \cdot b)$ comparisons must be made for each document, where m is the number of keyword terms across all taxonomic categories, a is the average number of instances of each keyword per document, n is the number of entities provided, and b is the average number of entity instances per document. Changing any single one of these variables will result in computational load changing with O(n) complexity, but their cumulative effects can quickly add up. For parallelization purposes, each keyword is independent of each other keyword and each entity is independent of each other entity. This means that in an infinitely parallel (theoretical) computational scheme, the system runs on $O(a \times b)$, which will vary as a function of the risk and text domains.

The system may automate term expansion by using similarity calculations of semantic vectors. These vectors are generated by training a skipgram model, which relies on words and subwords from the same data source as the initial extractions. This ensures that domain usage of language is well-represented, and any rich domain-specific text may be used to train semantic vectors.

For each taxonomic risk term encountered, the model vocabulary for the minimized normalized dot product $$\frac{r \cdot w}{\|r\|\|w\|}$$

(e.g., a basic similarity score) is searched, and the system returns the top-scoring vocabulary terms as candidates for taxonomic expansion.

After processing, the resulting extracts are deduped, preserving the lowest distance rank version. Extracts may then be rank ordered by shortest distance and highest frequency keyword, and selection for inclusion in a summary proceeds. For example, selection may occur according to the process of Algorithm 2.

---
Algorithm 2 Extract Selection
---
Require: ranked list by distance and keyword frequency
   while summary is less than n number of words do
      if keyword not in selectedWords then
         summary+=top extract
         selectedWords+=keyword
         remove extract
      else
         rerank remaining results
         selectedWords=[ ]
      end if
   end while
   return summary
---

EXAMPLE

Figure 3:
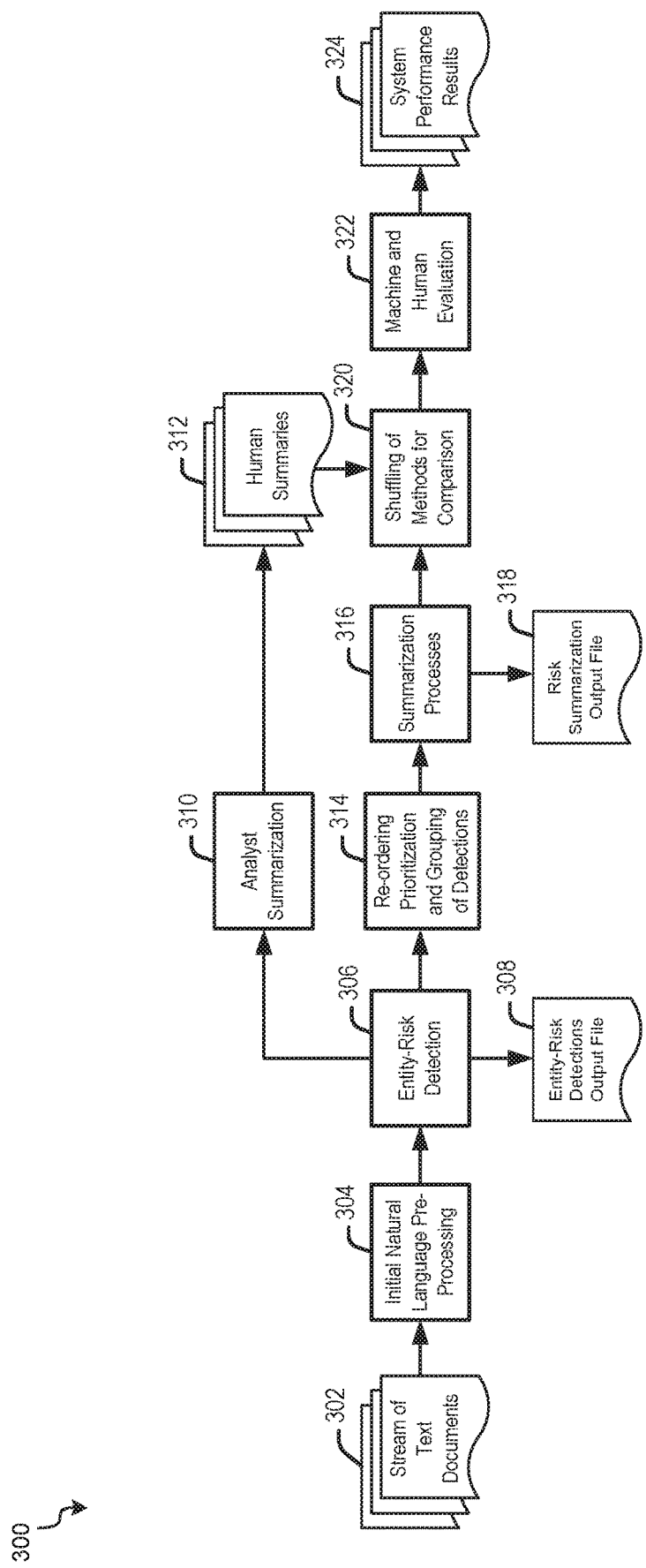
FIG. 3 is a block diagram of a system for summarizing data and testing the summary in accordance with the present disclosure.

FIG. 3 shows an example system 300 in accordance with the present disclosure. The system 300 includes stream of text documents 302, initial natural language pre-processing 304, entity-risk detection 306, entity-risk detections output file 308, analyst summarization 310, human summaries 312, re-ordering prioritization and grouping of detections 314, summarization processes 316, risk summarization output file 318, shuffling of methods for comparison 320, machine and human evaluation 322, and system performance results 324.

Stream of text documents 302 includes a corpus of documents (e.g., one or more documents) that are provided to system 300, such as to initial natural language pre-processing 304. Initial natural language pre-processing 304 is configured to perform low level natural language processing on stream of text documents 302 to generate processed data that indicates one or more sentences. For example, tokenization and/or sentencization may be performed on the stream of text documents 302 to generate the processed data.

The processed data may be received by entity-risk detection 306. Entity-risk detection 306 is configured to identify one or more matched pairs of entities and keywords based on an entity list, a first keyword list (e.g., a user-generated keyword list), and a second keyword list (e.g., an automatically expanded keyword list). For example, for each keyword, entity-risk detection may determine a nearest entity to the keyword (and whether it is in the same sentence or not), and then determine bi-directional pairings, e.g., the entity that is closest to the keyword, whether the entity is before or after the keyword (even if the keyword is in a different sentence). In some implementations, entity-risk detection 306 is configured to operate in parallel such that multiple keywords may be paired with entities concurrently. After identifying the one or more matched pairs, entity-risk detection 306 extracts a plurality of sentences that include the one or more matched pairs. Each extracted sentence may include a single sentence or multiple sentences. The plurality of extracted sentences are output as entity-risk detections output file 308. Additionally, the plurality of extracted sentences are provided to analyst summarization 310. Analyst summarization 310 represents one or more human analysts that generate a plurality of human summaries based on the plurality of extracted sentences. The plurality of human summaries are provided downstream as human summaries 312.

Additionally, the plurality of extracted sentences are provided to re-ordering prioritization and grouping of detections 314. Re-ordering prioritization and grouping of detections 314 is configured to order the plurality of extracted sentences based on distances (e.g., token distances) between the keyword and the entity in each extracted sentence, frequencies of the keywords in each extracted sentence, or both. Re-ordering prioritization and grouping of detections 314 may output a ordered plurality of extracted sentences.

The ordered plurality of extracted sentences may be provided to summarization processes 316. Summarization processes 316 may be configured to identify a first set of extracted sentences and a second set of extracted sentences from the ordered plurality of extracted sentences, and to generate an extracted summary that includes at least one sentence of the first set of extracted sentences and at least one sentence of the second set of extracted sentences. The first set of extracted sentences corresponds to an entity and includes one or more keywords from the first keyword set, and the second set of extracted sentences corresponds to the entity and includes one or more keywords from the second keyword set. Summarization processes 316 may include multiple summarization processes, such as summarization processes that generate summaries with different orders of general and specific sentences, as well as summaries that include only a single extracted sentence, and off-the-shelf text summary programs (for comparison against the systems of the present disclosure), as further described herein. Summarization processes 316 may output one or more extracted summaries as risk summarization output file 318. Additionally, the one or more extracted summaries may be provided to shuffling of methods for comparison 320.

Shuffling of methods for comparison 320 may be configured to receive the one or more extracted summaries and human summaries 312, and may shuffle (e.g., randomize or pseudo-randomize the order of) the various results so that humans selected to compare the results do not know which results come from which summarization process (either automatic or human generated). The shuffled summaries are provided to machine and human evaluation 322.

Machine and human evaluation 322 may be configured to enable one or more humans to read the shuffled summaries and to rank the shuffled summaries based on preference, readability, and/or any other criteria. Results of the human selections may be output by system 300 as system performance results 324.

To test the performance of system 300 (and/or system 100 of FIG. 1), an experiment comparing the summaries generated by summarization processes 316 to human summaries 312 (e.g., one or more human-generated summaries) and summaries generated by one or more other computerized summary systems was designed. To perform the experiment, the top Fortune 100 companies from 2017 were selected as input (entities) into a proprietary news retrieval system for the most recent 1,000 articles mentioning each company (sources). Ignoring low coverage and bodiless articles, 99,424 individual documents were returned. Each identified article was fed into the system, and risk detections were found for Cybersecurity, Terrorism, and Legal risk categories with a distance cutoff of 100 tokens. A baseline extract was selected at random for each identified risk from the corresponding document for pairwise comparison.

TABLE 1

Sample risk terms: qualitatively bolded terms are more specific and SMALLCAPS terms are more general

| Initial Keyword Taxonomy | Expanded Keyword Taxonomy |
|---|---|
| Cybersecurity - n = 20 antivirus, cybersecurity, data breach, hacker, malware, phishing, ransomware, virus, . . . | n = 32 (additional) 4frontsecurity, ATTACK, BEWARE, cyberattack, cyberstalking, DETECTION, IDENTITY, phish, SECURITY, . . . |
| Terrorism - n = 23 bioterrorism, car bomb, counter-terrorism, extremist, hijack, jihad, lone wolf, mass shooting, suicide bomber, terrorist, . . . | n = 47 (additional) bombmaker, CONSEQUENCE, CRITICISM, fascist, HATE, jihadi, MASSIVE, MILITARY, SUSPICIOUS, . . . |
| Legal - n = 26 allegation, bankruptcy, indictment, infringement, lawsuit, litigation, plaintiff, statutory violation, . . . | n = 54 (additional) ACTION, CARELESSNESS, extortion, foreclosure, infringe, RECKLESS, REQUIRE, SUIT, tort, . . . |

The probability of a multi-sentence extract occurring in the output is high-70% (30% single sentence) with an average token distance of 30 for multi or single sentence extraction (standard deviation is as high as 25 tokens). Based on distances, a threshold of 100 words was selected for the experiment to control, as best as possible, an extract per third.

The possibility of content of the extracts having a general or specific character is indicated in Table 2 below. A polysemy average was calculated-for every word in the keyword sets, the number of definitions per word from WordNet was averaged. The higher the number, the more definitions, the more general the description can become. As shown in Table 2, there is nearly a two-fold increase in the Cybersecurity and Legal categories with a smaller increase for Terrorism. The overall indication is that the expansion of the Terrorism initial list maintained a similar mix of specific and general, but the expansion skewed more general for Cybersecurity and Legal. While the filtering of documents by entities may somewhat control the contexts, there is no guarantee of this. However, the system may benefit from operating with a specified entity-risk relationship (controlling the extraction, expansion, and source material).

TABLE 2

WordNet Polysemy Averages

|  | Initial | Expanded |
|---|---|---|
| Cybersecurity | 1.40 | 2.41 |
| Terrorism | 2.13 | 2.46 |
| Legal | 1.73 | 3.60 |

The experiment included asking six human analysts (e.g., subject matter experts in risk analysis) to write multiple human summaries (e.g., human summaries 312) for each entity-risk relationship using extracts filtered by lowest distance and keyword (rather than all possible extracts and identified documents). The human summaries were used in three evaluations involving four systems designed according to implementations described herein, such that it could be determined if modeling of information specificity translated into improved performance. The four systems included: "Seed"-seed extracts (e.g., extracted sentences including keywords included in the seed/first keyword set) selection only; "Expanded"-expanded extracts (e.g., extracted sentences including keywords included in the expanded/second keyword set); "MixedThirds"-selection in thirds (e.g., three sentence combinations), selected based on expanded->seed->seed (general->specific->specific); and "AlternateThirds"-selection in thirds, expanded->seed->expanded (general->specific->general). Additionally, the three evaluations included a random baseline system as well as two existing extractive summarization systems, TextRank and LexRank. For the Baseline system, for a given entity risk relationship, extracts are randomly selected until the 100 word limit is reached. For TextRank, each extract is a node in a graph with weighted edges by normalized word overlap between sentences. For LexRank, each extract is a node in a graph with weighted edges based on cosine similarity of the extract set's TF-IDF vectors.

Example summaries generated by some of the various systems are shown below in Table 3. For example, Table 3 includes example summaries output based on a Costco-Legal entity-risk relation.

TABLE 3

Sample Expanded and Human Summaries for
Costco-Legal Entity Risk Relationship

| System | Costco-Legal |
|---|---|
| Human | A lawsuit was brought against Costco for negligence, carelessness, and having defective conditions. Costco is also being investigated for potential corporate misconduct concerning sales of products that are alleged to be counterfeit and/or to Infringe patent/trademark rights. The Acushnet Company who is the holder of certain Titleist golfball patents is also in litigation with Costco alleging patent infringement and false advertising. |
| AlternateThirds | The suit claims Costco should be held liable for the injuries due to its "negligence and carelessness," and for having "dangerous or defective conditions." In addition to the litigation with Tiffany & Co., the Company has also recently been in litigation with Acushnet Company, represented to be the holder of certain Titleist golf ball patents, concerning allegations that Costco has committed patent infringement and false advertising in connection with the sale of certain golf balls in its membership warehouses. The plaintiffs did not accept Costco's proposals for settlement and Costco ultimately prevailed on a motion for summary judgment. |

TABLE 3-continued

Sample Expanded and Human Summaries for
Costco-Legal Entity Risk Relationship

| System | Costco-Legal |
|---|---|
| MixedThirds | The suit claims Costco should be held liable for the injuries due to its "negligence and carelessness," and for having "dangerous or defective conditions." In her motion, Pronzini challenges Costco's allegation that it is headquartered in Washington. The lawsuit claims Costco should have known about any "unsafe, dangerous or defective conditions" in the store. |
| Expansion | Costco's settlement of this matter does not constitute an admission of staff's charges as set forth in paragraphs 4 through 12 above. In addition to the litigation with Tiffany & Co., the Company has also recently been in litigation with Acushnet Company, represented to be the holder of certain Titleist golf ball patents, concerning allegations that Costco has committed patent infringement and false advertising in connection with the sale of certain golf balls in its membership warehouses. |

Automatic 'intrinsic' evaluations were performed to compare the system 300 and human summaries with ROUGE-Recall-Oriented Understudy for Gisting Evaluation, and BLEU—Bilingual Evaluation Understudy. ROUGE and BLEU alone can be limited without additional evaluations to support or appropriately characterize results. Consequently, two additional manual evaluations were conducted: an AB Preference Judgment task, pitting all systems against human summaries, and a Readability Judgment task using a 3-Point scale: Fluent (5)=no grammatical or informative barriers; Understandable (3)=some grammatical or informative barriers; Disfluent (1)=significant grammatical or informative barriers.

Intrinsic evaluations may provide insight into how informative the systems are where the manual 'extrinsic' evaluations provide insight as to how the information is packaged. Bot evaluations are relative to the human summaries, assumed to be of the highest quality.

In Table 4 below, average F1 for unigram (ROUGE-1), bigram (ROUGE-2), longest common subsequence (ROUGE-L), and skip-4-gram using unigram co-occurrence statistics (ROUGE-SU) and the BLEU (4-gram) score are shown. Each system summary was compared against two human summaries from the same entity-risk relationship. System summaries that pulled from the expanded (more general) set of extractions performed best across all versions of ROUGE and BLEU-4 with MixedThirds and AlternateThirds outperforming all other systems.

TABLE 4

ROUGE-1, -2, -L, -SU Average F1 and BLEU-4
Results (top three scores bolded).

| System | ROUGE-1 | ROUGE-2 | ROUGE-L | ROUGE-SU | BLEU-4 |
|---|---|---|---|---|---|
| Seed | 9.18 | 2.78 | 8.04 | 3.45 | 29.48 |
| Expanded | 20.45 | 10.81 | 18.35 | 11.55 | 30.22 |
| MixedThirds | 12.29 | 4.11 | 10.43 | 4.93 | 31.79 |
| AlternateThirds | 18.12 | 8.51 | 15.66 | 9.37 | 32.05 |
| Baseline | 9.74 | 3.35 | 9.33 | 4.03 | 30.61 |
| TextRank | 8.05 | 2.80 | 9.01 | 3.24 | 28.62 |
| LexRank | 9.48 | 2.83 | 8.74 | 3.53 | 29.96 |

Figure 4:
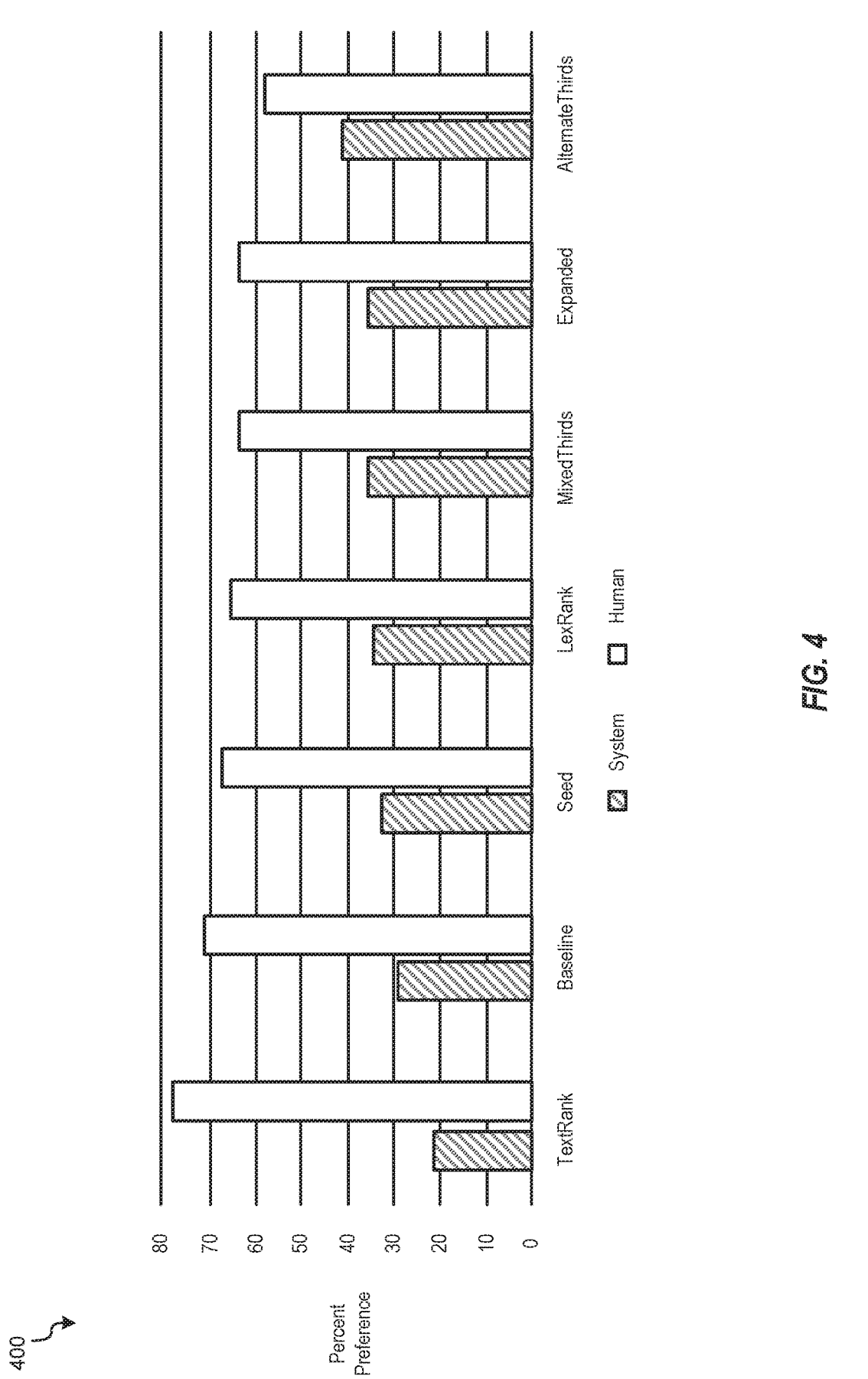
FIG. 4 illustrates a graph of expert preference ratings.

For the Preference Judgment task, 2000 annotations (1000 double annotated instances) were collected for human summaries versus all systems. FIG. 4 illustrates a chart 400 of preference values for the various summaries tested. As shown in FIG. 4, there is a trend of greater preference of the expanded over non-expanded systems (e.g., the preference values corresponding to system-generated summaries are closer to the preference values for human-generated summaries for expanded systems, such as MixedThirds and AlternateThirds).

This is supported with Pearson's $x^2$ and associated p values in Table 5 below. As shown in Table 5, there is no statistically significant difference between AlternateThirds and equivalent human curated summaries. Statistically significant differences exist between human summaries and all other systems with a narrowing gap for the expanded systems. Additionally, the average Kappa for the Preference Judgment was quite low at 0.069, indicating not only the difficulty of the task, but a fairly significant source of disagreement among the risk analysts (not the same analysts that authored the summaries).

TABLE 5

Pearson's $x^2$ for Preference Judgments

| System | $x^2$ (p [d.f. = 1]) |
| --- | --- |
| Seed | 17.64 (p < 0.001) |
| Expanded | 12.82 (p < 0.001) |
| MixedThirds | 11.68 (p < 0.001) |
| AlternateThirds | 3.68 (p < 0.05) |
| Baseline | 23.12 (p < 0.001) |
| TextRank | 49.08 (p < 0.001) |
| LexRank | 13.62 (p < 0.001) |

For the Readability Judgment task, 1600 annotations were collected (800 doubly annotated instances) for all systems and human summaries. The human summaries garnered the highest scores with a 3.75 average, with the Expanded and AlternateThirds (along with the Baseline) achieving scores between 2.372 and 2.54. AlternateThirds and Expanded also had the highest proportion of "5" ratings (20%) compared to 50% for the human summaries and 15% or lower for the other systems. Average Kappa is improved compared to the Preference Judgment task, but is similarly low at 0.163.

TABLE 6

Average Readability (1-3-5 Scale)

| System | Readability |
| --- | --- |
| Human | 3.75 |
| Baseline | 2.54 |
| AlternateThirds | 2.50 |
| Expanded | 2.37 |
| Seed | 2.31 |
| MixedThirds | 2.20 |
| LexRank | 2.14 |
| TextRank | 1.92 |

Overall, AlternateThirds and MixedThirds systems have the highest content overlap and are packaged in a way that yield high readability and preference ratings when compared to the human summaries. The scope of the results in the experiment is limited to the risk mining space as this informed the nature of extraction and likely inhibited the performance of TextRank and LexRank; though LexRank did outperform the Seed system on the Preference evaluation.

When variation was observed in the results (low scores for these systems, or high scores for non-alternating systems) it often had more to do with the experimental design rather than specificity ordering. For example, Baseline extractions received "5" ratings when they were short coherent discourses, such as in sentence (6).

(6) Well before a deranged anti-Semite opened fire in the Tree of Life Synagogue, instances of anti-Semitism and hate crimes were on the rise. White nationalists have felt emboldened to march in American cities. And days before the shooting, a gunman tried to shoot up a predominantly black church. When he failed, he went to a nearby Kroger outside Louisville, Ky., and killed two people there instead.

Thresholding at 100 words created lower scored AlternateThirds summaries if the third expanded extract could not be selected because the word limit would be exceeded. Further, while the top distance ranked extracts were the substrate for the human summaries, the systems could use a broader range of extracts and create (though less on point) interesting highly rated summaries-e.g., the Seed system in sentence (7).

(7) If there is such a thing as a hate crime, we saw it at Kroger and we saw it in the synagogue again in Pittsburgh," McConnell said. The Kroger Co. announced today a $1 million donation to the USO as part of its annual Honoring Our Heroes campaign. Kroger's Honoring Our Heroes campaign has supported veterans, active duty military and their families since 2010, raising more than $21 million through both corporate funds and customer donations.

While a variety of discourse level extractive summarization approaches attempt to create well-formed discourses, of which specificity and a host of other pragmatic phenomena would follow suit and contribute to higher quality, sentence ordering approaches are most similar to what is described herein. For single documents, maintaining the order of extracts in the source material has provided positive improvements in quality. Sentence ordering for multi-document summarization is harder as there is no a priori structural discourse relationship between documents. Nonetheless, chronology can be inferred and ordered across clusters of documents for improved output.

Discourse awareness in the system comes from semantic coherence associated with token distances, and rhetorical coherence associated with the multi-sentence extractions and the nature of specificity in the extraction sets; all of which are artifacts of the risk mining extraction (which has linear complexity relative to the volume of data). While current research and detection of text specificity (and granularity) shows a great deal of promise as well as sentence ordering approaches generally, it is a very difficult and complex problem where investigations into WordNet and autoencoding can only begin to scratch the surface.

For short extractive multi-document summaries in the context of the risk mining system described herein, focusing on the discourse primitive of information specificity has provided tangible improvements in output quality. Future experimentation will extend to contexts beyond risk mining to test the generalizability of the methods in less controlled environments. Further, as summary thresholds increase, the methods may require additional constraints to ensure, for example, that global discourse patterns are adhered to.

As noted, observed improvements did not require intricate control of the extracted information. While greater control to improve output more consistently could improve results, it should be considered whether the burden to the system is worthwhile where it is not clear, based on current research into specificity and discourse, that improvement will be found. Nonetheless, by focusing on specificity leaning features to improve output in extractive summary discourses, improvements can be seen in the absence of more in-depth NLP.

While applied here to the risk mining space, in other implementations, the system could be used for any data, entities and taxonomies to support generalized event monitoring and summarization. Additionally, the system may address high system recall relative to maintaining flexibility for analyst users and dynamic definition of the risk problem space-this may include summarization of results for better presentation, alternative source data at the direction of the analyst for given risk categories, and token distance thresholding.

Figure 5:
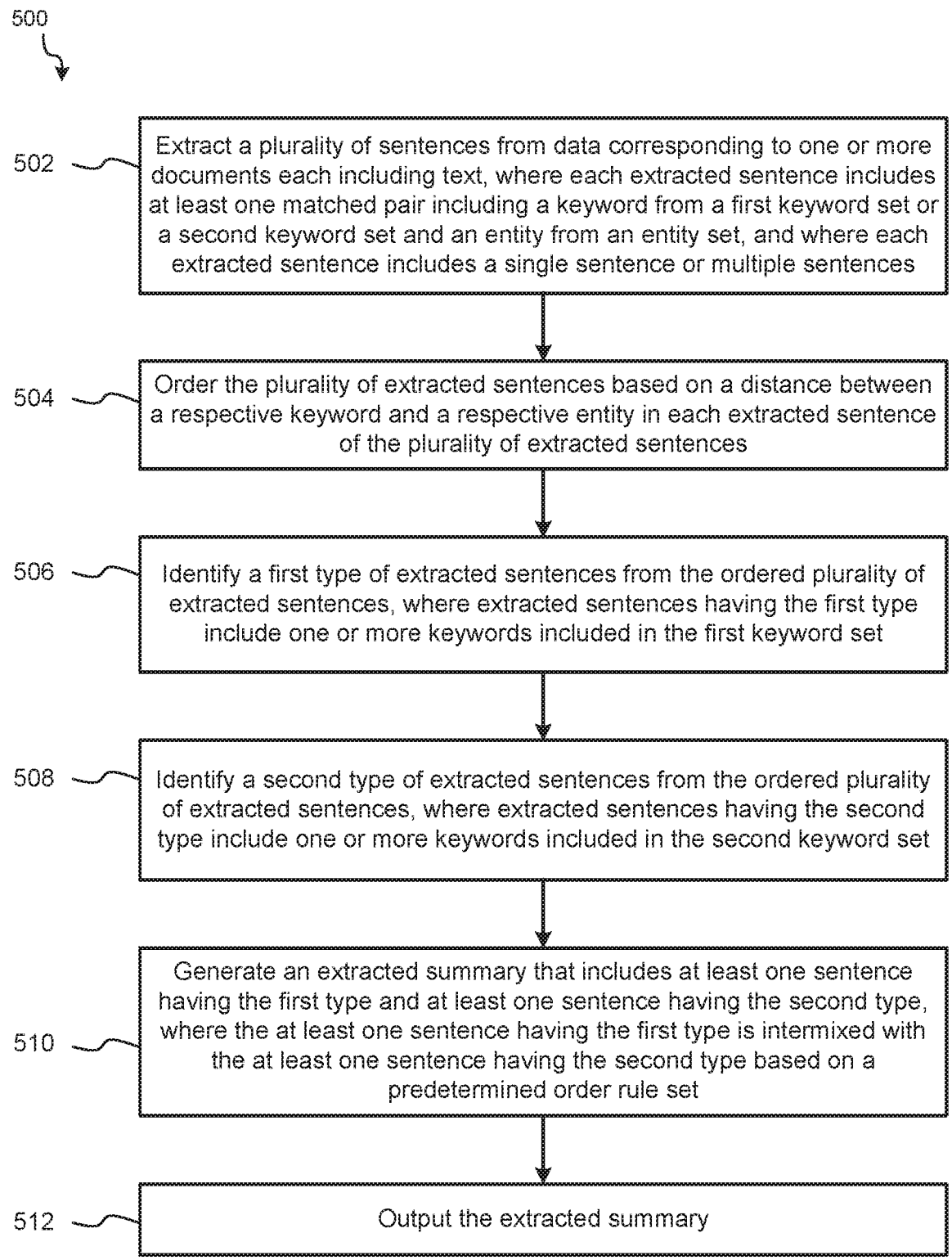
FIG. 5 is a flow chart illustrating an example of a method of summarizing data.

FIG. 5 is a flow diagram of a method 500 of summarizing data. In some implementations, the method 500 may be performed by system 100 of FIG. 1, one or more components to execute operations of FIG. 2, or system 300 of FIG. 3.

Method 500 includes extracting a plurality of sentences from data corresponding to one or more documents each comprising text, at block 502. Each extracted sentence includes at least one matched pair including a keyword from a first keyword set or a second keyword set and an entity from an entity set. Each extracted sentence includes a single sentence or multiple sentences. For example, sentence extractor 120 may extract a plurality of sentences from data received from data sources 170, the data corresponding to one or more documents.

Method 500 includes ordering the plurality of extracted sentences based on a distance between a respective keyword and a respective entity in each extracted sentence of the plurality of extracted sentences, at block 504. For example, sentence organizer 121 may order (e.g., prioritize) the plurality of extracted sentences based on a distance (e.g., a token distance) between the keyword and the entity in each extracted sentence. The distance may indicate a predicted relevance of the extracted sentence, such that the extracted sentences are ordered based on predicted relevance.

Method 500 also includes identifying a first type of extracted sentences from the ordered plurality of extracted sentences, at block 506. Extracted sentences having the first type include one or more keywords included in the first keyword set. For example, sentence identifier 122 may identify, from the ordered plurality of extracted sentences, a first type of extracted sentences that include one or more keywords included in the first keyword set. In some implementations, the first type may be "specific."

Method 500 includes identifying a second type of extracted sentences from the ordered plurality of extracted sentences, at block 508. Extracted sentences having the second type include one or more keywords included in the second keyword set. For example, sentence identifier 122 may identify, from the ordered plurality of extracted sentences, a second type of extracted sentences that include one or more keywords included in the second keyword set. In some implementations, the second type may be "general."

Method 500 also includes generating an extracted summary that includes at least one sentence having the first type and at least one sentence having the second type, at block 510. The at least one sentence having the first type is intermixed with the at least one sentence having the second type based on a predetermined order rule set For example, summary extractor 123 may generate an extracted summary that includes at least one sentence having the first type and at least one sentence having the second type by intermixing the at least one sentence having the first type with the at least one sentence having the second type based on a predetermined order rule set. The predetermined order rule set may be configured to enable generation of summaries that are more grammatically natural and readable and may indicate an order of sentences for inclusion in summaries based on sentence type (e.g., the first type and the second type).

Method 500 further includes outputting the extracted summary, at block 512. For example, output generator 124 may output the extracted summary, for example, for display to a user. Additionally, or alternatively, the extracted summary may be stored at a memory.

In some implementations, the first keyword set includes a user-generated keyword set, and the second keyword set includes an expanded keyword set. For example, the first keyword set may be generated based on in input to server 110, and the second keyword set may be automatically generated by server 110, such as by taxonomy expander 125, based on the data received from data sources 170 and the first keyword set.

In some implementations, generating the extracted summary includes including, in the extracted summary, a first sentence having the second type, followed by a second sentence having the first type, followed by a third sentence having the first type, based on the predetermined order rule set. For example, summary extractor 123 (configured in accordance with the MixedThirds implementation described above) may include a general sentence (e.g., a sentence having the second type), followed by a specific sentence (e.g., a sentence having the first type), followed by a second specific sentence in the extracted summary based on the predetermined order rule set indicating inclusion of sentence triples ordered general->specific->specific. Alternatively, generating the extracted summary includes including, in the extracted summary, a first sentence having the second type, followed by a second sentence having the first type, followed by a third sentence having the second type, based on the predetermined order rule set. For example, summary extractor 123 (configured in accordance with the AlternateThirds implementation described above) may include a general sentence, followed by a specific sentence, followed by a second general sentence in the extracted summary based on the predetermined order rule set indicating inclusion of sentence triples ordered general->specific->general.

In some implementations, method 500 may further include determining whether to include an additional sentence in the extracted summary based on a determination whether a sum of a length of the extracted summary and a length of the additional sentence is less than or equal to a threshold. For example, summary extractor 123 may, after adding (e.g., appending) an extracted sentence to the extracted summary, determine whether a sum of a length of the extracted summary and a length of an additional sentence is less than or equal to a threshold. If the sum is less than or equal to the threshold, summary extractor 123 may include the additional sentence in the extracted summary. If the sum is greater than the threshold, summary extractor 123 discards the additional sentence (e.g., does not add the additional sentence to the extracted summary), and completes generation of the extracted summary. In this manner, a maximum word length (e.g., the threshold) of extracted summaries may be maintained.

In some implementations, method 500 also includes generating the second keyword set. Generating the second keyword set includes generating one or more semantic vectors. Generating the second keyword set also includes, for each keyword of the first keyword set, determining a semantic vector having a highest similarity score to the keyword and identifying one or more terms of the determined semantic vector as a candidate term. Generating the second keyword set further includes selecting at least one candidate term to be added to the first keyword set to generate the second keyword set. For example, taxonomy expander 125 may generate semantic vectors and identify terms of semantic vectors as candidate terms based on similarity scores. In some such implementations, generating the one or more semantic vectors includes, for each of the one or more documents, generating a corresponding semantic vector based on a skipgram model that utilizes words and subwords from the document. For example, a skipgram generator, such as Fasttext, may be used to generate the semantic vectors. Generating the second keyword set further includes, for each keyword of the first keyword set, comparing a similarity score of the determined semantic vector having the highest similarity score to a threshold. The semantic vector is used to identify the candidate term based on a determination that the similarity score of the determined semantic vector is greater than or equal to the threshold.

In some implementations, method 500 also includes generating a second extracted summary that includes at least one sentence having the first type and at least one sentence having the second type. The at least one sentence having the first type is intermixed with the at least one sentence having the second type based on the predetermined order rule set. For example, summary extractor 123 may generate a second extracted summary that includes at least one sentence having the first type (e.g., specific) and at least one sentence having the second type (e.g., general). The sentences may be ordered in one of multiple configurations based on the predetermined order rule set, such as general->specific->specific, general->specific->general, or alternating specific (or general) followed by general (or specific), as non-limiting examples.

In some implementations, ordering the plurality of extracted sentences is based further on frequencies of respective one or more keywords included in each extracted sentence. For example, sentence organizer 121 may order the plurality of extracted sentences based further on frequencies of the keywords included in each extracted sentence, in addition to ordering the plurality of extracted sentences based on the distance between the keyword and the entity in each extracted sentence. Alternatively, sentence organizer 121 may order the plurality of extracted sentences based only on the distances (and not the frequencies), or based only on the frequencies (and not the distances).

In some implementations, method 500 further includes receiving a selection of a first event category of multiple event categories and retrieving the first keyword set based on the selection of the first event category. For example, different keyword sets may correspond to different event categories. To illustrate, one keyword set may correspond to "terrorism" and another keyword set may correspond to "legal." In some such implementations, the multiple event categories include cybersecurity, terrorism, legal/non-compliance, or a combination thereof.

In some implementations, an extracted sentence of the plurality of extracted sentences includes the multiple sentences, and the multiple sentences include a sentence that includes the at least one matched pair, a sentence that includes the keyword of the at least one matched pair, a sentence preceding the sentence that includes the keyword of the at least one matched pair, a sentence following the sentence with the keyword the at least one matched pair, a sentence that includes the entity of the at least one matched pair, a sentence preceding the sentence that includes the entity of the at least one matched pair, a sentence following the sentence with the entity of the at least one matched pair, or a combination thereof. Additionally, or alternatively, the data is received from a data source that includes a streaming data source, news data, a database, or a combination thereof, and the entity set indicates an individual, a company, a government, an organization, or a combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-5 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for summarizing data, the method comprising:
   performing taxonomy expansion on a first keyword set and data corresponding to one or more documents each comprising text to generate a second keyword set having a greater number of keywords than the first keyword set;
   extracting a plurality of sentences from the data corresponding to the one or more documents, wherein each extracted sentence includes at least one matched pair including a keyword from the first keyword set or the second keyword set and an entity from an entity set, and wherein each extracted sentence comprises a single sentence or multiple sentences;
   ordering the plurality of extracted sentences based on a distance between a respective keyword and a respective entity in each extracted sentence of the plurality of extracted sentences;
   identifying a first type of extracted sentences from the ordered plurality of extracted sentences, wherein extracted sentences having the first type include one or more keywords included in the first keyword set;
   identifying a second type of extracted sentences from the ordered plurality of extracted sentences, wherein extracted sentences having the second type include one or more keywords included in the second keyword set;
   generating an extracted summary that includes at least one sentence having the first type and at least one sentence having the second type, wherein the at least one sentence having the first type is intermixed with the at least one sentence having the second type based on a predetermined order rule set; and
   outputting the extracted summary.

2. The method of claim 1, wherein the first keyword set comprises a user-generated keyword set, and wherein the second keyword set comprises an expanded keyword set based on the first keyword set.

3. The method of claim 1, wherein generating the extracted summary comprises including, in the extracted summary, a first sentence having the second type, followed by a second sentence having the first type, followed by a third sentence having the first type, based on the predetermined order rule set.

4. The method of claim 1, wherein generating the extracted summary comprises including, in the extracted summary, a first sentence having the second type, followed by a second sentence having the first type, followed by a third sentence having the second type, based on the predetermined order rule set.

5. The method of claim 1, further comprising determining whether to include an additional sentence in the extracted summary based on a determination whether a sum of a length of the extracted summary and a length of the additional sentence is less than or equal to a threshold.

6. The method of claim 1, wherein generating wherein performing the taxonomy expansion to generate the second keyword set comprises:
   generating one or more semantic vectors;
   for each keyword of the first keyword set:
      determining a semantic vector having a highest similarity score to the keyword; and
      identifying one or more terms of the determined semantic vector as a candidate term; and
   selecting at least one candidate term to be added to the first keyword set to generate the second keyword set.

7. The method of claim 6, wherein:
   generating the one or more semantic vectors comprises, for each of the one or more documents, generating a corresponding semantic vector based on a skipgram model that utilizes words and subwords from the document; and
   generating the second keyword set further comprises, for each keyword of the first keyword set, comparing a similarity score of the determined semantic vector having the highest similarity score to a threshold,
   wherein the semantic vector is used to identify the candidate term based on a determination that the similarity score of the determined semantic vector is greater than or equal to the threshold.

8. The method of claim 1, wherein the plurality of extracted sentences are ordered based on a number of words between the keywords and the respective entities in the plurality of extracted sentences.

9. The method of claim 1, wherein the predetermined order rule set indicates that sentences having the first type and sentences having the second type are to be intermixed in an alternating order for inclusion in summaries.

10. A system comprising:
a processor; and
a memory storing instructions executable by the processor to cause the processor to:
perform taxonomy expansion on a first keyword set and data corresponding to one or more documents each comprising text to generate a second keyword set having a greater number of keywords than the first keyword set;
extract a plurality of sentences from the data corresponding to the one or more documents, wherein each extracted sentence includes at least one matched pair including a keyword from the first keyword set or the second keyword set and an entity from an entity set, and wherein each extracted sentence comprises a single sentence or multiple sentences;
order the plurality of extracted sentences based on a distance between a respective keyword and a respective entity in each extracted sentence of the plurality of extracted sentences;
identify a first type of extracted sentences from the ordered plurality of extracted sentences, wherein extracted sentences having the first type include one or more keywords included in the first keyword set;
identify a second type of extracted sentences from the ordered plurality of extracted sentences, wherein extracted sentences having the second type include one or more keywords included in the second keyword set;
extract a summary that includes at least one sentence having the first type and at least one sentence having the second type, wherein the at least one sentence having the first type is intermixed with the at least one sentence having the second type based on a predetermined order rule set; and
output the extracted summary.

11. The system of claim 10, further comprising:
a database coupled to the processor.

12. The system of claim 11, wherein the database is configured to store the first keyword set, the second keyword set, the entity set, one or more thresholds, one or more extracted sentences, a plurality of matched pairs, one or more extracted summaries, the predetermined order rule set, or a combination thereof.

13. The system of claim 10, further comprising:
an interface configured to enable communication with a data source that stores the data, an electronic device, or a combination thereof.

14. A computer-based tool including non-transitory computer readable media having stored thereon computer code which, when executed by a processor, causes a computing device to perform operations comprising:
performing taxonomy expansion on a first keyword set and data corresponding to one or more documents each comprising text to generate a second keyword set having a greater number of keywords than the first keyword set;
extracting a plurality of sentences from the data corresponding to the one or more documents, wherein each extracted sentence includes at least one matched pair including a keyword from the first keyword set or the second keyword set and an entity from an entity set, and wherein each extracted sentence comprises a single sentence or multiple sentences;
ordering the plurality of extracted sentences based on a distance between a respective keyword and a respective entity in each extracted sentence of the plurality of extracted sentences;
identifying a first type of extracted sentences from the ordered plurality of extracted sentences, wherein extracted sentences having the first type include one or more keywords included in the first keyword set;
identifying a second type of extracted sentences from the ordered plurality of extracted sentences, wherein extracted sentences having the second type include one or more keywords included in the second keyword set;
generating an extracted summary that includes at least one sentence having the first type and at least one sentence having the second type, wherein the at least one sentence having the first type is intermixed with the at least one sentence having the second type based on a predetermined order rule set; and
outputting the extracted summary.

15. The computer-based tool of claim 14, wherein the operations further comprise:
generating a second extracted summary that includes at least one sentence having the first type and at least one sentence having the second type, wherein the at least one sentence having the first type is intermixed with the at least one sentence having the second type based on the predetermined order rule set.

16. The computer-based tool of claim 14, wherein ordering the plurality of extracted sentences is based further on frequencies of respective one or more keywords included in each extracted sentence.

17. The computer-based tool of claim 14, wherein the operations further comprise:
receiving a selection of a first event category of multiple event categories; and
retrieving the first keyword set based on the selection of the first event category.

18. The computer-based tool of claim 17, wherein the multiple event categories comprise cybersecurity, terrorism, legal/non-compliance, or a combination thereof.

19. The computer-based tool of claim 14, wherein:
an extracted sentence of the plurality of extracted sentences comprises the multiple sentences; and
the multiple sentences comprise a sentence that includes the at least one matched pair, a sentence that includes the keyword of the at least one matched pair, a sentence preceding the sentence that includes the keyword of the at least one matched pair, a sentence following the sentence with the keyword the at least one matched pair, a sentence that includes the entity of the at least one matched pair, a sentence preceding the sentence that includes the entity of the at least one matched pair, a sentence following the sentence with the entity of the at least one matched pair, or a combination thereof.

20. The computer-based tool of claim 14, wherein:
the data is received from a data source that comprises a streaming data source, news data, a database, or a combination thereof; and
the entity set indicates an individual, a company, a government, an organization, or a combination thereof.

* * * * *